March 14, 1950 H. A. BASS 2,500,788

MULTIVIBRATOR CIRCUIT

Filed Dec. 6, 1947

Inventor

HARLAND A. BASS.

By Alden D. Redfield.

Attorney

Patented Mar. 14, 1950 2,500,788

UNITED STATES PATENT OFFICE 2,500,788

MULTIVIBRATOR CIRCUIT

Harland A. Bass, Mount Healthy, Ohio, assignor to Avco Manufacturing Corporation, Cincinnati, Ohio, a corporation of Delaware Application December 6, 1947, Serial No. 790,131

4 Claims. (Cl. 250—36)

Figures 1, 2:
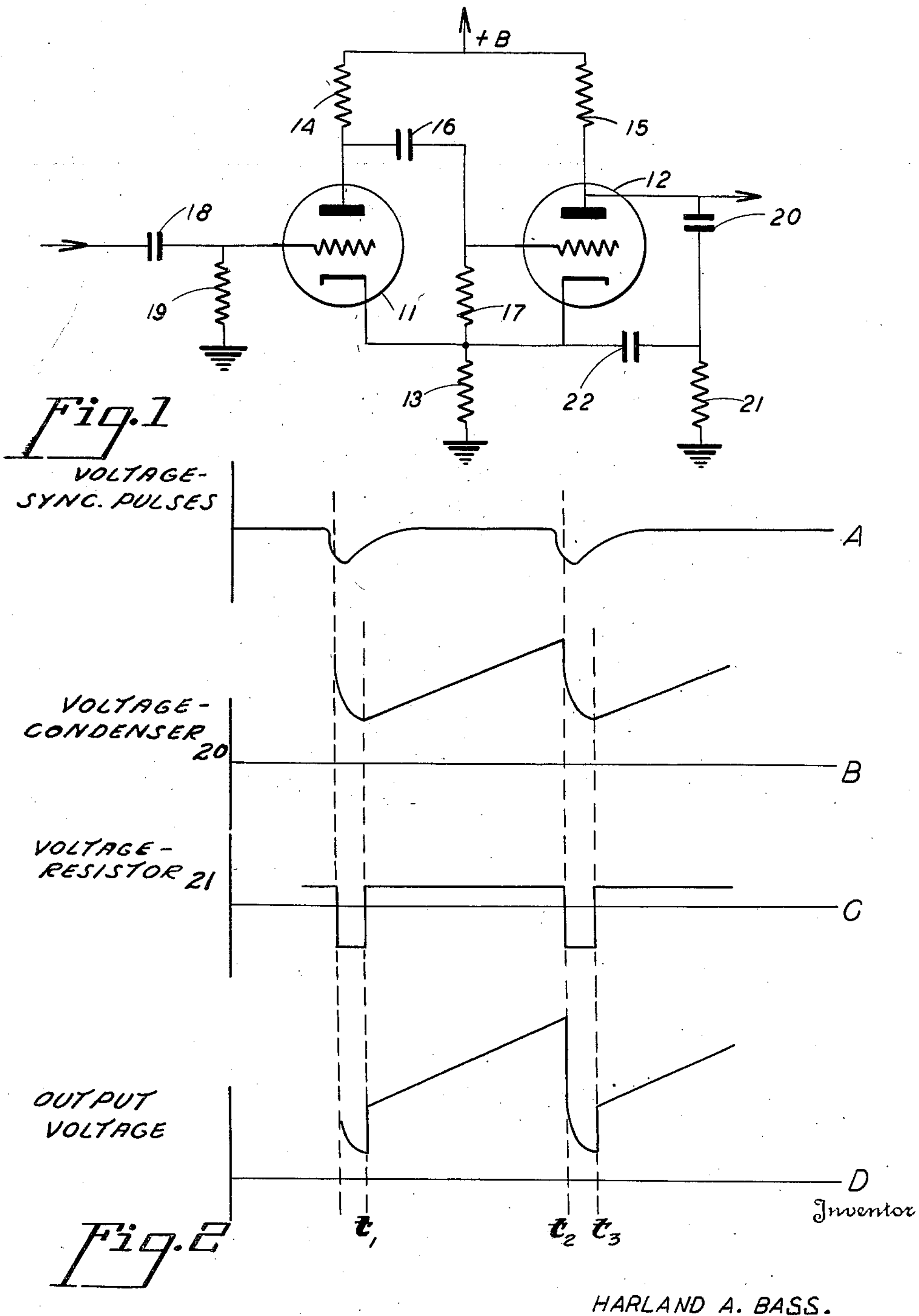

The present invention relates to television receivers and is particularly directed to an improvement in multivibrator oscillators of the type employed as trapezoidal voltage generators in television receivers. While the invention has a wide range of prospective applications, it is of particular utility as employed in the vertical deflecting system of a television receiver and is effective in producing accurate interlaced scanning. Broadly described in one aspect, the invention resides in the provision of a degenerative network in a multivibrator, whereby it possesses a minimum of sensitivity to the trailing edges of synchronizing pulses and is made operably independent of the shape of the back edges of such pulses.

In picture tube television receivers, the cathode ray is caused to scan the screen in synchronism with the scanning at the transmitter by propagating horizontal and vertical synchronizing signals along with the picture signals. In the type of television system which is standardized and preferred at the present time, the synchronizing signals are so transmitted that the scanning is interlaced by the odd-line method. For the purpose of obtaining the so-called interlaced pattern, the cathode ray is deflected an odd number of times (say, 525 lines) every two fields (two fields being equal to one frame), the relation of the line frequency (say, 15,750 cycles per second) to the field frequency (say, 60 cycles per second) being such that the scanning of each odd field starts at the same point on the upper left hand corner of the screen, while the scanning action for each even field starts at a point which is located at a distance of one half a line to the right from the common starting point for the odd fields. In this way, the lines for the even fields are disposed in the spaces between the lines for the odd fields, and one complete frame comprises one even field and one odd field.

For the purpose of line scanning and framing, a horizontal synchronizing signal is transmitted at the end of each scanning line and utilized at the receiver to control a circuit for deflecting the cathode ray horizontally. At the end of each field, a field signal is transmitted and utilized at the receiver to control the circuit for deflecting the ray vertically. Because of the odd-line relation hereinabove discussed, the odd and even field signals occur at different times with respect to the horizontal synchronizing signals. The effect of this is to cause the odd field signals to have a slightly different shape than the even field signals. Since the frequency of the field signals is 60 cycles per second, this behavior is equivalent to the introduction of an undesired 30-cycle component in the field signals. If it be assumed, for example, that each detected, separated and integrated odd field signal is a negative pulse having a steep wave front and an inclined trailing edge (curve A, Fig. 2), each even field signal may be a negative pulse having substantially the same steep wave front but a longer trailing edge.

The detected and separated field signals are employed to control a vertical deflection oscillator or trapezoidal wave generator comprising a multivibrator oscillator having a series R-C network across its output, for generating a trapezoidal voltage wave. This multivibrator may in turn control a current amplifier coupled to the vertical deflecting coils of the picture tube. The precise multivibrator timing required to obtain a uniform spacing of the interlaced lines is adversely affected and impaired by the lack of identity between the odd and even field signals, or otherwise-caused non-uniformity between field signals. Accordingly, the basic object of the invention is to provide, in a multivibrator circuit, an improvement which prevents "pairing" and enhances interlace by rendering the multivibrator operation independent of lack of identity between alternate field signals.

While I do not desire to be limited to any particular theory of operation, the prevailing theory presently accepted by those skilled in the art is that the multivibrator is affected in different ways by the trailing edge of each odd field signal and the longer trailing edge of each even field signal so that the above-mentioned adverse effects could be eliminated if the even and odd field signals could be made exactly alike, or if successive field signals could be made uniform. Considerable progress tending toward uniformity of framing signals has been made at the transmitter end of television systems by the present system of transmitting not only horizontal synchronizing and vertical field signals but also equalizing signals at a frequency equal to twice the line scanning frequency, but, in spite of many unsuccessful attempts, satisfactory uniformity has never been achieved. The FCC standard signal is non-uniform.

Another object of my invention is to provide, in a multivibrator, an improvement whereby the multivibrator becomes relatively insensitive to the trailing edge of each field pulse so that its operation is not adversely affected by non-identical trailing edges accompanying the above-mentioned 30-cycle component or otherwise caused.

It has also been found that one of the major causes of improper interlacing is the influence of the strong field of the horizontal deflecting circuit on the vertical deflecting circuit. Also, some "cross-talk" occurs from the horizontal deflecting circuit into the vertical deflecting circuit. If signals from the horizontal deflecting circuit appear in the vertical deflecting circuit with sufficient amplitude, that factor directly affects the operation of the multivibrator employed in the vertical deflecting circuit. However, signals from the horizontal deflecting circuit can affect the vertical deflecting multivibrator in this way only during its period of susceptibility or the time during which the first tube, such as tube 12 (Fig. 1), of the multivibrator is conductive. Further, the integration circuit employed at the receiver for separating the field signals from the line sync signals may carry over into the period of susceptibility the effect of some of the horizontal pulses preceding this period.

Accordingly, another important object of the invention is to reduce the effect of undesired influences of the horizontal deflecting circuit on the vertical deflection circuit of a cathode ray tube apparatus. According to one acceptable theory of the operation of the invention, this objective is accomplished by making the period of susceptibility very short, and by making the multivibrator less sensitive to high frequency signals of line frequency, say.

A general object of the invention is to provide an improved multivibrator which is highly effective in providing interlace.

For a better understanding of the present invention, together with other and further objects, capabilities and advantages thereof, reference is made to the following description of the accompanying drawings. In the drawings, Fig. 1 comprises a circuit diagram of a multivibrator including the improvement in accordance with the invention; Fig. 2 comprises a set of curves employed as an aid in illustrating the operation of the circuit symbolically shown in Fig. 1.

It will be recognized by those skilled in the art that the multivibrator illustrated in Fig. 1 bears some points of similarity to the well known cathode coupled Potter oscillator, described in an article by J. L. Potter, pages 713 et seq., Proceedings of the Institute of Radio Engineers, June 1938, vol. 26, No. 6, published by the Institute of Radio Engineers at New York, New York. It comprises a pair of suitable vacuum tubes, 11, 12, such as the triodes shown, having a common cathode resistor 13 and individual anode resistors 14 and 15, respectively, connected to a common plate supply terminal +B (not shown). The cathode resistor 13 couples the output circuit of the output or first tube 12 to the input or control electrode-cathode circuit of the second tube 11. The output or anode circuit of tube 11 is coupled to the input or cathode-control electrode circuit of tube 12 by an R-C network comprising a coupling capacitor 16 and a grid resistor 17, the latter being connected between the ungrounded side of cathode resistor 13 and the grid of tube 12.

The multivibrator shown is particularly useful as a trapezoidal voltage generator for the horizontal deflecting circuit of a television receiver. Its output may be coupled to a current amplifier (not shown) which in turn is coupled to the vertical deflecting coils of a cathode ray tube (not shown). As is well known to those skilled in the art, the current through the deflecting coils must be of a saw-tooth wave form, where a linear sweep is to be obtained. The linear rise in current through the coils requires a linear rise in voltage across the coil resistance and a constant voltage across the coil inductance. The periodic wave of voltage across the deflecting coils is therefore the sum of a saw-tooth wave and a rectangular wave. A resultant voltage wave of this shape (curve D. Fig. 2) is produced at the multivibrator output, which includes a series combination of a saw-tooth capacitor 20 and a peaking resistor 21.

The multivibrator may be preceded by suitable circuits for separating the line and framing signals from the video signals and from each other. It will be understood that synchronizing signals of negative polarity (curve A, Fig. 2) for controlling the multivibrator are applied to the input circuit of tube 11 through a suitable network such as a coupling capacitor 18 and a grid resistor 19, the resistor being connected between the grid of tube 11 and ground.

Considering now the gross operation of the circuit elements so far described and deferring for the moment a discussion of the effects of capacitor 22, it will be assumed that at time $t_1$, capacitor 20 begins to charge through a time-constant circuit comprising resistor 21, capacitor 20, anode resistor 15 and the plate voltage supply source. The circuit constants are so arranged that capacitor 20 charges with a linear or saw-tooth voltage characteristic (curve B, Fig. 2). During the interval between $t_1$ and $t_2$, corresponding to the cathode ray tube trace interval, tube 12 is non-conductive, being blocked off by the bias on its grid caused by the charge on capacitor 16. As capacitor 16 exponentially discharges through resistor 17 and the cathode-anode path of tube 11, the voltage of the grid of tube 12 relative to its cathode rises exponentially in a positive direction as capacitor 16 discharges. As the bias occasioned by capacitor 16 falls almost to the point at which tube 12 would become conductive, a pulse of negative polarity is applied, at the time $t_2$, to the grid of tube 11. Since tube 11 inverts and amplifies this pulse, the resultant amplified pulse, as applied to the grid of tube 12, is of positive polarity, so that at time $t_2$ the grid voltage of tube 12 rises above cut-off and tube 12 becomes conductive. A regenerative action immediately follows, during the interval from $t_2$ to $t_3$. As tube 12 becomes more conductive, its plate current flow in the common cathode resistor 13 renders the cathode of tube 11 more positive, an effect which in turn raises the plate voltage of tube 11 and the grid voltage of tube 12. The cumulative result is that tube 12 is very quickly brought to a condition of high plate conductance. This condition occurs substantially simultaneously with the leading edge of the field pulse. At time $t_2$ the grid of tube 12 is driven highly positive by an amount greater than the rise of its cathode in a positive direction. Tube 12 then draws grid current and capacitor 16 charges quickly through a time-constant circuit comprising resistor 13, the grid-cathode impedance of tube 12, capacitor 16, resistor 14 and the space current source. Then, as the grid of tube 12 approaches cathode potential, the grid-to-cathode current in tube 12 ceases to flow, opening a switch, as it were, in the charging circuit and leaving a high negative charge on the grid end of capacitor 16, which cuts off the plate current in tube 12. As the plate current of tube 12 decreases, the cathode of tube 11 becomes less positive, tube 11 draws greater plate current, the plate voltage of tube 11 falls and a negative-going pulse is applied through the R-C coupling network 16, 17, 13 to the grid of tube 12. The regenerative action then causes tube 12 to be cut off very sharply at time $t_3$.

The interval from $t_2$ to $t_3$ corresponds to the re-trace interval and is known as the period of susceptibility. During this period the saw-tooth capacitor 20 discharges through the cathode-anode path of tube 12. It will be apparent that the trailing edge of a field pulse appears at the grid of tube 12 as a potential of decreasing positive polarity. It has been seen that a negative-going pulse applied to the grid of tube 12 is the influence which causes this tube very sharply to cut off at time $t_3$. Further, the time constant of the charging path of capacitor 16 is so arranged that the interval $t_2$—$t_3$ is very short. Such trailing edge tends, therefore, to permit a delay in the time of cut-off of tube 12 and the beginning of the trace interval. In fact, any undesired signal applied with positive polarity (even if decreasing) to the grid of tube 12 during the period of susceptibility tends to permit a delay in the beginning of the trace interval. It follows, therefore, that the longer trailing edges of the even field pulses impair interlace in that they permit the beginning of the trace interval to delay for a longer time than do the shorter trailing edges of the odd field pulses. The result is that in the absence of the improvement provided by the present invention the interval between $t_2$ and $t_3$ would be different for the even fields than for the odd fields.

In accordance with the invention, there is provided an improvement which cures this undesired condition and results in a very effective interlace. A degenerative network is provided between the output of tube 12 and the input of tube 11. Specifically, a capacitor 22, for example, is interposed between the junction of saw-tooth capacitor 20 and of peaking resistor 21 and the cathode of tube 11. It will be seen that a negative-going voltage as applied to the cathode of tube 11 tends to render tube 11 conductive and therefore to render less positive the plate of tube 11 and the grid of tube 12. Since the effect of this network is such that, in response to a negative pulse applied to the grid of tube 11, a negative pulse is also applied to the cathode of tube 11, this network is degenerative, it renders the multivibrator less sensitive to the shape or length of the trailing edge of the field pulse. The higher the frequency, the greater the degenerative action, so that the multivibrator is particularly insensitive to frequencies of higher order—such as line frequency—than its operating frequency.

Considering now the operation of the system as affected by the degenerative network 20, 22, reference is made to curve A of Fig. 2 for a representation of the synchronizing pulses. The voltage characteristic of capacitor 20 is as illustrated in curve B, the voltage linearly rising between times $t_1$ and $t_2$ as the saw-tooth capacitor is charged through the time-constant circuit comprising resistor 21, capacitor 20, resistor 15 and the space current source. Between times $t_2$ and $t_3$, the saw-tooth capacitor 20 discharges through the relatively short time-constant circuit comprising resistor 21, capacitor 20, resistor 13 and the cathode-anode path of tube 12. Curve C represents the rectangular voltage characteristic of the signal appearing across resistor 21. It will be seen that the last-mentioned potential is of negative polarity during the regenerative period or period of re-trace, i. e., when saw-tooth capacitor 20 is discharging. Curve D shows the resultant output potential of the whole multivibrator. This is the potential that is amplified by a current amplifier (not shown) and ultimately employed to develop a saw-tooth wave of current in the deflecting coils. The potential appearing across resistor 21 and represented by curve C is applied to the input circuit of tube 11 in a degenerative manner. It will be observed that this potential has an effect opposite to that produced by a delaying slope of the trailing edge of the externally applied field synchronizing pulse. The potential across resistor 21 is applied to tube 11 in such a manner that, as amplified by tube 11, it tends to cut tube 12 off.

The time when the saw-tooth capacitor 20 begins to charge through resistors 15 and 21 should be determined by the natural multivibrator action which in turn should govern interlace. It has been shown that this time was heretofore subjected to an undesired variation by the undesired non-uniformity in the trailing edge components in the synchronizing pulses, thus impairing interlace. This difficulty occurred, not at the time when tube 12 became conductive, but at the time when tube 12 was cut off. In other words, difficulty was not experienced at the time of the leading edge of the synchronizing pulses but on the contrary was attributed to non-uniformity in the trailing edges. The arrangement which I provide in accordance with the invention leaves the multivibrator with great sensitivity, at the time of the leading edge of the synchronizing pulse, or beginning of the regenerative period, at which instant the effective gain around the regenerative multivibrator loop is at a maximum. However, following this instant, the gain is reduced by applying the voltage developed across peaking resistor 21 to the cathode of tube 11. A comparison of curves A and C of Fig. 2 will show that, simultaneously with the trailing edge of synchronizing pulse, there is applied to the cathode of tube 11 a pulse which cuts down the sensitivity of the multivibrator, whereby the operation of the multivibrator is made substantially independent of the duration and shape of the trailing edge.

While I do not desire to be limited to any particular or precise theory of operation of this multivibrator, which has been found both experimentally and commercially to yield highly satisfactory results, I believe that the theory of operation suggested is consonant with currently accepted electronic doctrine.

While I further do not desire to be limited to specific circuit parameters, the following circuit dimensions have been found eminently satisfactory in one successful commercial embodiment of the invention:

| Element: | Description |
|---|---|
| Capacitor 18 | 0.01 mfd. |
| Resistor 19 | 1 megohm |
| Tubes 11 and 12 | Each one-half of 6SN7GT |
| Resistor 14 | 15,000 ohms |
| Resistor 15 | 3.9 megohms |
| Capacitor 22 | 0.005 mfd. |
| Capacitor 20 | 0.05 mfd. |
| Resistor 21 | 5600 ohms |
| Resistor 13 | 1800 ohms |
| Resistor 17 | 1 megohm |
| Plate potential | 300 V. D. C. |

Thus it will be seen that the invention comprises, in a sweep circuit of the type comprising a discharge tube 12 having anode, control electrode and cathode elements, a switching tube 11 having anode, control electrode and cathode elements, a common potential source (+B, ground) and a common cathode resistor 13 connected to the negative terminal of said source, means 16 for coupling the anode of said switching tube to the control electrode of said discharge tube, the aforementioned elements being included in a cathode-coupled multivibrator, in which negative pulses applied to the cathode-control electrode circuit of the keying tube trigger the discharge tube into conductivity, the combination comprising an anode resistor 15 for the discharge tube and a first capacitor 20 and a peaking resistor 21 in series across said source, said first and second resistors and first capacitor forming a long time-constant circuit for linearly charging said first capacitor during periods of non-conductivity of said discharge tube, said second resistor and capacitor and the cathode-anode circuit of said first tube being included in a short time-constant circuit for discharging said first capacitor during the shorter periods of conductivity of said discharge tube.

While there has been shown and described what is at present considered to be the preferred form of the present invention, it will be obvious to those skilled in the art that various modifications and substitutions of equivalents may be made therein without departing from the true invention, and it is accordingly intended in the appended claims to cover all such changes and modifications as fall within the true scope of the invention.

Having thus described my invention, I claim:

1. In a cathode-coupled multivibrator sweep circuit of the type comprising a first resistor, a first capacitor, a second resistor and a source of unidirectional current connected in series, a first electron tube having plate, grid and cathode elements, a third resistor connected between said cathode and grid elements, a second electron tube having plate, grid and cathode elements, a second capacitor coupling the plate of the second tube to the grid of the first tube, a fourth resistor between the plate of said second tube and the positive terminal of said source, and a common resistor in the connection of the cathodes of both of said tubes to the other terminal of said source, said first resistor being connected between the plate of said first tube and the positive terminal of said source and said first resistor and first capacitor and second resistor being connected in series across said source, said second resistor being connected between said first capacitor and the negative terminal of said source, all of the aforementioned elements comprising a cathode-coupled multivibrator in which a first capacitor and second resistor are employed as a sawtooth capacitor and peaking resistor to develop an output wave consisting of a linearly increasing voltage generated across the first capacitor during the period of non-conductivity of the first tube and a pulse of opposite polarity produced across the second resistor during the period of conductivity of the first tube, the improvement which comprises a capacitor connected between the cathodes of both of said tubes and the junction of said second resistor and said first capacitor.

2. In a cathode-coupled multivibrator sweep circuit of the type comprising a first vacuum tube having cathode, control electrode and anode elements, a second vacuum tube having cathode, control electrode and anode elements and an anode load impedance, means for coupling the anode of the second tube to the control electrode of the first tube, a source of unidirectional voltage having positive and negative terminals, a common cathode impedance connecting both cathodes to the negative terminal of said source, and means for applying negative synchronizing pulses to the cathode-control electrode circuit of the second tube, the improvement which comprises a series circuit including a first resistor and a first capacitor and a second resistor in series across said source, said first resistor being connected between the anode of said first tube and the positive terminal of said source, said first and second resistors and said first capacitor forming a long time-constant circuit for linearly charging said first capacitor during periods of non-conductivity of said first tube, said second resistor being connected between said first capacitor and the negative terminal of said source, said second resistor and capacitor and the cathode-anode circuit of said first tube being included in a short time-constant circuit for discharging said first capacitor during the shorter periods of conductivity of said first tube, voltage pulses of negative polarity being developed across said second resistor during periods of conductivity of said first tube, and means for applying said voltage pulses to the input circuit of said second tube comprising a capacitor connected between said cathodes and the junction of said first capacitor and said second resistor.

3. In a sweep circuit of the type comprising a discharge tube having anode, control electrode and cathode elements, a switching tube having anode, control electrode and cathode elements and an anode load, a common potential source, and a common cathode resistor connected to the negative terminal of said source, means for coupling the anode of said switching tube to the control electrode of said discharge tube, the aforementioned elements being included in a cathode-coupled multivibrator, in which negative pulses applied to the cathode-control electrode circuit of the switching tube trigger the discharge tube into conductivity, the combination comprising an anode resistor for the discharge tube and a first capacitor and a peaking resistor in series across said source, said first and second resistors and first capacitor forming a long time-constant circuit for linearly charging said first capacitor during periods of non-conductivity of said discharge tube, said second resistor being connected between said first capacitor and the negative terminal of said source, said second resistor and capacitor and the cathode-anode circuit of said discharge tube being included in a short time-constant circuit for discharging said first capacitor during the shorter periods of conductivity of said discharge tube, voltage pulses of negative polarity being developed across said second resistor during periods of conductivity of said discharge tube, and means for applying said voltage pulses to the input circuit of said switching tube comprising a capacitor connected between said cathode and the junction of said first capacitor and said second resistor.

4. In a sweep circuit of the type comprising a discharge tube having anode, control electrode and cathode elements, a switching tube having anode, control electrode and cathode elements and an anode load, a common potential source, and a common cathode resistor connected to the negative terminal of said source, means for coupling the anode of said switching tube to the control electrode of said discharge tube, the aforementioned elements being included in a cathode-coupled multivibrator, in which negative pulses applied to the cathode-control electrode circuit of the switching tube trigger the discharge tube into conductivity, the combination comprising an anode resistor for the discharge tube and a first capacitor and a second or peaking resistor in series across said source, said second resistor being connected between said first capacitor and the negative terminal of said source, said first and second resistors and first capacitor forming a long time-constant circuit for linearly charging said first capacitor during periods of non-conductivity of said discharge tube, said second resistor and capacitor and the cathode-anode circuit of said discharge tube being included in a short time-constant circuit for discharging said first capacitor during the shorter period of conductivity of said discharge tube, and means for degeneratively applying the voltage developed across said second resistor to the cathodes of said tubes.

HARLAND A. BASS.

REFERENCES CITED

The following references are of record in the file of this patent:

UNITED STATES PATENTS

| Number | Name | Date |
|---|---|---|
| 2,157,434 | Potter | May 9, 1930 |
| 2,268,872 | Hewlett | Jan. 6, 1942 |